United States Patent [19]

Liu

[11] 4,255,534
[45] Mar. 10, 1981

[54] BINARY POLYCARBONATE COMPOSITIONS

[75] Inventor: Ping Y. Liu, Naperville, Ill.

[73] Assignee: General Electric Company, Pittsfield, Mass.

[21] Appl. No.: 132,190

[22] Filed: Mar. 20, 1980

[51] Int. Cl.$^3$ ............................................. C08L 53/00
[52] U.S. Cl. ..................................................... 525/91
[58] Field of Search ......................................... 525/91

[56] References Cited

U.S. PATENT DOCUMENTS 3,666,701    5/1972    Marrs ...................................... 525/91

Primary Examiner—J. Ziegler
Attorney, Agent, or Firm—William F. Mufatti

[57] ABSTRACT

Binary compositions are disclosed which comprise a mixture of a high molecular weight thermoplastic, aromatic polycarbonate and a styrene/butadiene/caprolactone block copolymer.

8 Claims, No Drawings the examples, all parts and percentages are by weight unless otherwise specified.

EXAMPLE 1

Ninety-six (96) parts of an aromatic polycarbonate, derived from 2,2-bis(4-hydroxyphenyl)propane and having an intrinsic viscosity (I.V.) in the range of from about 0.46 to about 0.49 dl/g as determined in methylene chloride solution at 25° C., was mixed with four (4) parts of a styrene/butadiene/caprolactone (S/B/C) block copolymer having a weight ratio of 66/25/8. The ingredients were then blended together by mechanically mixing them in a laboratory tumbler and the resulting mixture was fed to an extruder which was operated at about 265° C. The resulting extrudate was comminuted into pellets and the pellets were injection molded at about 290° C. –310° C. into transluscent test specimens of about 5″ by ½″ by ¼″ and 5″ by ½″ by ⅛″, the latter dimensions being the specimens thicknesses. Izod impact strengths of these specimens were measured according to the notched Izod test, ASTM D256, and are set forth in Table I. The ductile-brittle (D/B) transition temperatures, (the highest temperature at which a sample begins to exhibit a brittle mode of failure rather than a ductile mode of failure) were obtained according to the procedures of ASTM D256 and are also listed in Table I. Transparency results set forth in Table I were obtained on a Gardner colorimeter. The sample labeled CONTROL was obtained from a polycarbonate resin having an I.V. of about 0.46–0.49 dl/g and was prepared without the S/B/C block copolymer.

EXAMPLE 2

The procedure of Example 1 was repeated exactly, except that the weight ratio of S/B/C in the block copolymer was 56/26/18, respectively. The test results obtained are listed in Table I.

EXAMPLE 3

The procedure of Example 1 was repeated exactly, except that the weight ratio of S/B/C in the block copolymer was 25/50/25, respectively. The test results obtained are listed in Table I.

From the foregoing Table, it can be seen that when the level of butadiene in the S/B/C block copolymer exceeded 30 weight percent (Example 3), the sample obtained has no transparency; i.e. it was opaque. Although the impact strength of the transluscent samples (Examples 1 and 2) was not as good as the opaque sample (Example 3) after being heat aged at 125° C., it was about as good as that of the CONTROL. However, impact strength of the transluscent samples (Examples 1 and 2) were about equal to that of the opaque sample (Example 3) prior to being heat aged.

What is claimed is:

1. A binary polycarbonate composition comprising an admixture of a high molecular weight aromatic polycarbonate and a minor amount of a styrene/butadiene/caprolactone block copolymer, the weight ratio of styrene:butadiene:caprolactone in said block copolymer being in the range of about 15–25: 45–55: 25–35.

2. The composition of claim 1 wherein said styrene/butadiene/caprolactone block copolymer is present in an amount of about 0.5–4.0 parts by weight per hundred parts of said aromatic ploycarbonate.

3. The composition of claim 2 wherein said block copolymer is present in an amount of about 1.0–3.0 parts by weight.

4. The composition of claim 1 wherein said weight ratio is about 55–65:20–30:10–20 and said composition is transluscent.

5. The composition of claim 1 wherein the aromatic polycarbonate is derived from 2,2-bis (4-hydroxyphenyl)propane.

6. A transluscent, binary polycarbonate composition comprising an admixture of a high molecular weight aromatic polycarbonate and a styrene/butadiene/caprolactone block copolymer in an amount of about 0.5–4.0 parts by weight per hundred parts of said aromatic polycarbonate, the weight ratio of styrene:butadiene: caprolactone in said block copolymer being about 55-65:20-30:10-20.

7. The composition of claim 6 wherein said block copolymer is present in an amount of about 1.0–3.0 parts by weight.

8. The composition of claim 6 wherein said aromatic polycarbonate is derived from 2,2-bis(4-hydroxy phenyl) propane.

TABLE I

| | | Impact Strength, ft. lb./in. | | | | |
|---|---|---|---|---|---|---|
| Composition of: | Transparency ⅛″, % | ¼″ Thick Not Aged | ⅛″ Thick Not Aged | ⅛″, Heat Aged at 125° C. 24 hrs. | 48 hrs. | D/B, ° C. ⅛″, Not aged |
| Example 1 | 16.1 | 12.0[1] | 15.3[1] | 2.8[2] | * | * |
| Example 2 | 12.0 | 12.4[1] | 15.3[1] | 2.8[2] | * | * |
| Example 3 | 0 | 12.2[1] | 15.3[1] | 12.7[1] | 12.0[1] | −23/−29** |
| CONTROL | 89.6 | 1.6[2] | 14.8[1] | 1.3[2] | * | >−5 |

[1]Samples failed with 100% ductility.
[2]Samples failed with 0% ductility.
*Test not made.
**Change from ductile mode of failure to brittle mode of failure noted over indicated range.

BINARY POLYCARBONATE COMPOSITIONS

The present invention is directed to transluscent, high molecular weight, aromatic polycarbonate compositions having improved aged impact strength and improved low temperature impact strength.

BACKGROUND OF THE INVENTION

It is well known that high molecular weight, aromatic polycarbonate resins have high impact strength below a critical thickness of between ⅛ and ¼ inches. Above this average thickness, the impact strength of such polycarbonate resins is low. It is also known that the impact strength of these polycarbonate resins decreases rapidly as temperatures decrease below about −5° C. as well as after aging at elevated temperatures above about 100° C. These characteristics limit the fields of applications of these resins. Thus, unmodified polycarbonates are not practical for use at low or high temperatures, particularly when good impact strength is required. Therefore, it is desirable to improve the impact strength of polycarbonate resins at both low and high temperatures as well as improve their aged impact strength and thereby expand the fields of application of such resins. In order to further expand the applications of such resins, it is also desirable that they be transluscent.

Polycarbonate compositions having improved impact strength at both high and low temperatures as well as improved aged impact strength are disclosed in co-pending applications Ser. Nos. 69,822; 69,823; 69,824; and 69,825 all of which were filed Aug. 27, 1979 as well as in co-pending applications Ser. Nos. 132,325, 132,330 and 132,331 filed of even date with this application. However, all of these compositions are opaque.

DESCRIPTION OF THE INVENTION

It has now been found that certain binary compositions comprising a high molecular weight, thermoplastic, aromatic polycarbonate and a styrene/butadiene/caprolactone block copolymer not only exhibit improved impact strength at both low and high temperatures as compared to unmodified polycarbonate resins, but that such binary compositions are also transluscent.

The high molecular weight, thermoplastic, aromatic polycarbonates which can be employed in the present invention are those homopolycarbonates and copolycarbonates and mixtures thereof which have average molecular weights of about 8,000 to more than 200,000, preferably about 20,000 to 80,000 and an intrinsic viscosity (I.V.) of about 0.40 to 1.0 deciliters/grams (dl/g) as measured in methylene chloride at 25° C. These polycarbonates are typically derived from dihydric phenols such as, for example, 2,2-bis(4-hydroxyphenyl)propane (also referred to as bisphenol-A; i.e., BPA), bis(4-hydroxyphenyl)methane, 2,2-bis(4-hydroxy-3-methylphenyl)propane, 4,4-bis(4-hydroxyyphenyl)heptane, 2,2-(3,5,3',5'-tetrachloro-4,4'-dihydroxyphenyl)propane, 2,2-(3,5,3',5'-tetrabromo-4,4'-dihydroxydiphenyl)propane, and (3,3'-dichloro-4,4'-dihydroxydiphenyl)methane. Other dihydric phenols which are suitable for use in preparing these polycarbonates are disclosed in U.S. Pat. Nos. 2,999,835; 3,028,365; 3,334,154; and 4,131,575, all of which are incorporated herein by reference.

The aromatic polycarbonates of the invention can be manufactured by known processes such as, for example, the interfacial polymerization technique wherein a dihydric phenol is reacted with a carbonate precursor, such as phosgene, in the presence of a suitable organic medium, such as methylene chloride. These processes are disclosed in the above identified U.S. Patents as well as in U.S. Pat. Nos. 4,018,750 and 4,123,436 which are incorporated herein by reference. Transesterification processes can also be employed to prepare these resins such as disclosed in U.S. Pat. No. 3,153,008, also incorporated herein by reference, as well as other processes known to those skilled in the art.

In addition, the aromatic polycarbonates of the invention can include the polymeric derivates of a dihydric phenol, a dicarboxylic acid, and carbonic acid, such as are disclosed in U.S. Pat. No. 3,169,131, incorporated herein by reference.

It is also possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in preparing the aromatic polycarbonate to be employed in the invention. In addition, blends of any of the above materials can be used to provide the aromatic polycarbonate.

Further, branched polycarbonates, such as are disclosed in U.S. Pat. No. 4,001,184, incorporated herein by reference, can also be employed as can blends of a linear polycarbonate and a branched polycarbonate to provide the aromatic polycarbonate of the invention.

The styrene/butadiene/caprolactone (S/B/C) block copolymers of the invention are commercially available or can be prepared by methods known in the art such as described by E. Clark and C. W. Childers, J. Apply. Poly. Sci., vol. 22, p. 1081 (1978) and by H. L. Hsieh, J. Apply. Poly. Sci., vol. 22, p. 1119 (1979) incorporated herein by reference.

The weight ratio of styrene:butadiene:caprolactone in these S/B/C block copolymers can be in the range of about 15-25:45-55:25-35. It has been found, however, that when the butadiene content in these S/B/C block copolymers is less than about 30 weight percent, transluscent products are obtained when such block copolymers are blended with aromatic polycarbonates. Furthermore, these transluscent polycarbonates also exhibit improved impact when not subjected to heat aging. For purposes of this invention, therefore, the weight ratio of styrene:butadiene:caprolactone in these blocks copolymers should be in the range of about 55–65:20–30:10–20, preferably about 60:25:15.

The amount of S/B/C block copolymer that can be employed in the binary compositions of the invention can be about 0.5–4.0, preferably 1.0–3.0, parts by weight per hundred parts of the aromatic polycarbonate.

It is also regarded to be among the features of this invention to include in the ternary polycarbonate composition conventional additives for purposes such as reinforcing, coloring or stabilizing the composition in conventional amounts.

The compositions of the invention are prepared by mechanically blending by conventional methods the high molecular weight aromatic polycarbonate with the S/B/C block copolymer.

EXAMPLES

The following examples set forth the best mode currently known to illustrate the invention and should not be construed as limiting the scope of the invention. In